United States Patent [19]

House et al.

[11] Patent Number: 4,714,512

[45] Date of Patent: Dec. 22, 1987

[54] POLYURETHANE COATINGS AND ADHESIVES

[75] Inventors: David W. House, Arlington Heights; Ray V. Scott, Jr., Addison, both of Ill.

[73] Assignee: UOP Inc., Des Plaines, Ill.

[21] Appl. No.: 821,722

[22] Filed: Jan. 23, 1986

Related U.S. Application Data

[63] Continuation-in-part of Ser. No. 715,719, Mar. 25, 1985, Pat. No. 4,578,446.

[51] Int. Cl.$^4$ ................................................. C09J 5/10
[52] U.S. Cl. ............................ 156/306.6; 156/331.4; 156/331.7; 427/385.5; 428/423.1; 528/64; 564/330
[58] Field of Search .................. 427/385.5; 428/423.1; 156/306.6, 331.7, 331.4; 564/330; 528/64

[56] References Cited

U.S. PATENT DOCUMENTS

| | | | |
|---|---|---|---|
| 3,111,450 | 11/1963 | Stevens | 156/331.7 |
| 3,194,793 | 7/1965 | Kogon | 564/330 |
| 3,285,879 | 11/1966 | Larson et al. | 528/64 |
| 3,711,571 | 1/1973 | Farah | 528/64 |

Primary Examiner—John J. Gallagher
Attorney, Agent, or Firm—Thomas K. McBride; John F. Spears, Jr.; Eugene I. Snyder

[57] ABSTRACT

The polyurethanes resulting from curing isocyanate-terminated urethane prepolymers with a N,N'-dialkylmethylenedianiline are broadly useful as coatings on the surface of objects made of metal, wood, glass, or plastic. Such coatings may be made based on either a 1-pack system or 2-pack system. The diamine N,N'-di(2-butyl)4,4'-methylenedianiline is a particularly useful diamine.

38 Claims, No Drawings

POLYURETHANE COATINGS AND ADHESIVES

CROSS-REFERENCE TO RELATED APPLICATION

This application is a continuation-in-part of my prior copending application Ser. No. 715,719, filed Mar. 25, 1985, now U.S. Pat. No. 4,578,446, all of which is incorporated herein.

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear resistance, high hardness, resistance to ozone degradation, yet are pourable and castable. Compared to metals, polyurethanes are lighter in weight, less noisy in use, show better wear and excellent corrosion resistance while being capable of cheap fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from their enormous diversity of properties resulting from a relatively limited number of reactants. Typically, polyurethanes are prepared on site by curing urethane prepolymers, which are adducts of polyisocyanates and polyhydric alcohols. A large class of such prepolymers are approximately 2:1 adducts of a diisocyanate, OCN—Y—NCO, and a diol, HO—Z—OH, whose resulting structure is OCN—Y—NHCO$_2$—Z—O$_2$CNH—Y—NCO. Although Y is susceptible of great variety, usually being a divalent alkyl, cyclohexyl, or aromatic radical, in fact the most available prepolymers are made from toluene-2,4-diisocyanate (TDI) or methylene-4,4'-diphenylisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, respectively.

The polyurethane elastomers are formed by curing the prepolymer. Curing is the reaction of the terminal isocyanate groups of the prepolymer with active hydrogens of a polyfunctional compound so as to form high polymers through chain extension and, in some cases, crosslinking. Diols, especially alkylene diols, are the most common curing agents for MDI-based prepolymers, and representing such diols with the structure HO—X—OH, where X is an organic moiety, most usually an alkylene group, the resulting polymer has as its repeating unit,

Where a triol or a higher polyhydric alcohol is used crosslinking occurs to afford a nonlinear polymer.

Although other polyfunctional chemicals, especially diamines, are theoretically suitable, with but a few exceptions none have achieved commercial importance as a curing agent. The major exception is 4,4'-methylene-di-ortho-chloroaniline, usually referred to as MOCA, a curing agent which is both a chain extender and a crosslinker. TDI-based prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with *some* prepolymers as to afford a desirable pot life, hence the use of, for example, MOCA as a curing agnet for TDI-based prepolymers. However, MOCA and other of the aforementioned diamines still remain too reactive to be used, for example, with MDI-based prepolymers.

Previously only primary aromatic diamines seem to have been used as curing agents. Presumably this is because secondary diamines were expected to have an unacceptably long pot life, and because they could act only as chain extenders in contrast to the crosslinking capabilities of primary diamines. Recently, however, we have found that certain N,N'-dialkyl-4,4'-methylenedianilines are generally effective curing agents for a broad range of urethane prepolymers. The resulting polyurethanes often have the advantage of being thermoplastic rather than thermosetting, thereby making them especially useful as coatings, adhesives, and sealants. The secondary aromatic diamines of this invention have commercially acceptable pot lives as curing agents for many prepolymers, and afford products with an impressive variety of properties.

Polyurethanes find extensive application as coatings and adhesives. Among the properties of polyurethanes particularly desirable in the coating art of their chemical resistance, light-stability, flexibility, toughness, weatherability, moisture resistance, abrasion resistance, gloss and color retention, and impact resistance. We have found that urethane prepolymers cured with the secondary amines we previously described are particularly suitable as coatings, and this application is directed toward that use.

SUMMARY OF THE INVENTION

The object of this invention is to use particular polyurethanes as coatings and adhesives. An embodiment comprises the use of polyurethanes resulting from curing a diisocyanate-terminated urethane prepolymer with an aromatic alkyl diamine. In a more specific embodiment the alkyl is a secondary alkyl moiety. In a still more specific embodiment the diamine is N,N'-di(2-butyl)-4,4'-methylenedianiline. Other embodiments will be apparent from the description which follows.

DESCRIPTION OF THE INVENTION

The invention herein is the use as coatings of polyurethanes resulting from curing a diisocyanate-terminated urethane prepolymer with an aromatic alkyl diamine, especially those with a secondary alkyl moiety. It has been found that such polyurethanes, themselves unique polymers only recently disclosed by us, have properties which lend themselves especially well to the coating art, hence these polyurethanes find particular application as coatings.

The urethane prepolymers used in the practice of this invention are isocyanate-terminated adducts of a polyisocyanate and polyhydric alcohols. Prepolymers which are adducts of diisocyanates and dihydric alcohols, or diols, are the most commonly used prepolymers in commerce today and will be used to exemplify and illustrate urethane prepolymers generally. However, it is to be clearly understood that this invention is applicable to urethane prepolymers generally, and should not be restricted to those prepolymers arising from diisocyanates and diols. As examples of such polyisocyanates may be cited the toluene diisocyanates, m-phenylene diisocyanate, tetramethylene diisocyanate, 1,6-hexamethylene diisocyanate, 1,4-cyclohexylene diisocyanate, 4,4'-methylene-dicyclohexyl diisocyanate, 4,4'-methylenediphenyl diisocyanate, 3,3'-dimethyl-4,4'-diphenylmethane diisocyante, and 1,5-tetrahydronaphthalene diisocyanate. As stated previously, TDI and MDI are currently the preferred diisocyanates in urethane prepolymers.

Among the diols frequently used in making urethane prepolymers are alkylene diols, such as ethylene glycol, 1,3-propylenediol, 1,4-butylenediol, and so forth. Diolethers and diolesters find widespread use in making urethane prepolymers. The diolethers, as exemplified by poly(alkyleneoxy) diols, are typically condensation products of alkylene oxides with glycols or water, with the number of alkyleneoxy groups in the molecule generally increasing as the ratio of oxide to glycol increases. Examples of glycols include ethylene glycol, propylene glycol and butylene glycol, and exemplary of the alkylene oxides are ethylene oxide, propylene oxide, butylene oxide, amylene oxide, and tetrahydrofuran. The diolesters often are esters of dicarboxylic acids and diols, especially the glycols previously exemplified. Most typically, such products are esters of linear or aromatic dicarboxylic acids, such as succinic, glutaric, adipic, pimelic, suberic, azelaic, sebacic, phthalic, terephthalic, isophthalic acids, and so on. But it needs to be stressed again that the structures cited above are merely illustrative and exemplary of the diisocyanates and diols which may be used in making a urethane prepolymer, and are not intended to be exhaustive.

The ratio of reactants used in preparing the prepolymer is generally expressed in terms of relative numbers of isocyanate and hydroxyl groups, respectively. In this context, an equivalent amount of isocyanate and diol contains an equal number of isocyanate and hydroxyl groups. The prepolymer may contain from about 1.5 to about 4.0 equivalents of diisocyanate relative to diol, but most commonly there are about 2 equivalents diisocyanate per diol.

The polyurethane elastomer is made by reacting the prepolymer with a secondary aromatic alkyl diamine of the structure.

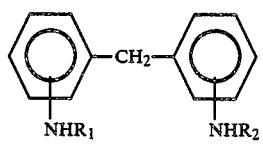

Each alkyl group, R, contains from 4 up to about 20 carbon atoms. Alkyl groups containing from 4 to 10 carbon atoms, and especially from 4 to about 8 carbon atoms, are particularly preferred. The alkyl group may be a primary, secondary, or tertiary alkyl group, although when the alkyl is tertiary there is the risk that cure time may be too long to be commercially acceptable. Secondary alkyl groups are preferred, and among these the secondary butyl group is particularly preferred. Of the positional isomers possible the 4,4'-methylenedianilines are most desirable.

Defining an equivalent of diamine as an amount which furnishes as many amino groups as there are isocyanate groups in the urethane prepolymer, from about 0.80 to about 1.2 equivalents of diamine are used in curing, with the range from about 0.85 to about 1.1 being the more usual one. Since each amino group has only one hydrogen, such secondary amines act only as a chain extender and not as a crosslinker. On the other hand, the curing mix may contain other materials, including crosslinkers such as polyols, in addition to, or partly replacing, the diamines of this invention. Where a crosslinking agent is present it typically will replace from about 5% to about 25% of the diamine. It is to be understood that such a curing mixture is contemplated as being within the scope of this invention.

The initial reaction between the urethane prepolymer and the diamine is between about 75° and about 120° C. The temperature is chosen, in part, to afford a convenient pot life, that is, the time interval from mixing the diamine and urethane prepolymer until the mixture is very difficult to pour. The elastomer is then cured to a tack-free state by heating at the same temperature range for an additional period from about 2 to about 24 hours.

The polyurethanes of this invention may be used as a coating for objects of metal, glass, wood, or plastic, for one feature of these polyurethanes is their ability to adhere strongly to a great variety of surfaces. Such versatility makes the materials of this invention particularly valuable.

The polyurethane surface coatings described here may be applied as 1-pack systems or 2-pack systems. See R. Heath, Urethanes Technology, March, 1985, 17-20. In the 1-pack system the fully reacted polyurethane is either in solution or is dispersed in a suitable medium. Examples of solvents which are suitable for use in the practice of this invention are aromatics generally, such as benzene, toluene, the xylenes, ethylbenzene, propylbenzene, and so forth; ketones, especially acetone and methylethylketone; and halogenated solvents such as chloroform, carbon tetrachloride, trichloroethylene, and so forth. The nature of the solvent is not particularly critical so long as it is unreactive with the polyurethane, although a solvent which can be readily evaporated is desirable. The same attributes apply to the dispersing medium, where a suspension of the polyurethane is used instead of a solution, with water often being a suitable dispersing medium.

The solution or dispersion of the polyurethane may be applied to the surface of the object in any convenient way. Often such material is sprayed on a surface, although it may be painted on, the surface may be dip-coated, roller coated, and so on. Such methods of application are well known in the art and need not be elaborated upon further. After the coating has been applied the solvent or dispersing medium is evaporated, generally at a somewhat elevated temperature depending upon the nature of the solvent or dispersing medium. Generally, such temperatures do not exceed about 120° C.

In the 2-pack system an isocyanate terminated urethane prepolymer and a suitable diamine are applied to a surface of the object, and the mixture is reacted or cured at an elevated temperature to form the polyurethane. Conventionally, the urethane prepolymer and the curing agent diamine are mixed immediately before applying to the surface of the object. However, it is possible to apply the urethane prepolymer and the diamine separately. In either event, the final polyurethane results from their reaction at elevated temperature, i.e., post-application curing is necessary. Curing occurs between about 75° and about 120° C., although higher temperatures may be employed if very short cure times are desired.

The materials of this invention are good adhesives for a variety of surfaces, whether the same or different, such as rubber, plastics, including foams, wood, metal, fabrics, paper, and leather. Depending upon the nature of the surfaces and the ultimate use of the bonded article, the polyurethanes may be used as hot melt adhesives or as a 2-component system where the polyurethane is formed in situ. When used as a hot melt adhesive, thin films of the polyurethane are first formed in any manner known to the art, as for example molding sheets between non-sticking surfaces such as poly(tetrafluoroethylene) at a temperature where the sheet is thermoplastic and compressible. A piece of film of appropriate dimensions and shape then is placed between the surfaces to be bonded and the surfaces squeezed or pressed together as by clamping so that each is in intimate contact with the film. Generally only a slight pressure, often not exceeding 2 psi, will suffice. The assembly is then heated to a temperature where the film melts or flows freely, and the assembly is maintained under pressure while the film cools. Adhesion develops during cooling of the melt, and pressure can be released when sufficient adhesive forces between the surfaces ensure adequate bond strength. This will be a function of the film nature, its thickness, the shape and material of the surfaces to be bonded, and so forth.

In the 2-component method the polyurethane is formed between the surfaces by reacting the urethane prepolymer with the aromatic alkyl diamines of this invention. This is done by adding a mixture of the prepolymer and diamine to one or both of the surfaces, squeezing or pressing together the surfaces, as by clamping, and then heating the joined assembly to a temperature from about 75° C. to about 150° C. for a time sufficient to form the polyurethane. Generally pressure on the joined assembly can be released after several minutes when sufficient bonding strength to hold the joined surfaces firmly has developed, although it must be recognized that ultimate or final bonding strength does not develop for some time thereafter as the polyurethane cures further.

The following examples are merely illustrative of this invention which is not to be limited thereto. In particular, the use of N,N'-di(2-butyl)-4,4'-methylenedianiline is to be construed only as representative of the diamines of this invention.

PREPARATION OF POLYURETHANE ADHESIVES

A thermoplastic polyurethane sheet was molded between two Teflon coated glass sheets at 130°–140° C. for 5–10 minutes under pressure to obtain a uniform thin film. The films, with varying thicknesses, were cut into small pieces and placed between two aluminum panels with a wooden holder and heated at 120°–130° C. The lap shear strength of this hot melt adhesive could then be determined. The thermoplastic polyurethane sheet was placed between cloth and aluminum panels and pressed at 120°–140° C. under pressure to melt the polyurethane sheet. This sample was used to determine the 180° peel strength.

The lap shear and the peel strength at 180° were tested on the Instron according to ASTM D-3163 and D-903, respectively. The sward and pencil hardness of the polyurethane coatings were measured on a Sward Rocker and Brumbaugh pencil. The solvent resistance was determined on the surface of the polyurethane coatings by using the double rub technique with MEK or xylene. The number of double rubs was recorded to express the solvent resistance properties. The impact resistance of the polyurethane coatings was measured on a Gardner-SPI Modified Variable Height Impact Tester using both the direct and indirect techniques. The chemical resistance was measured by placing the panels with polyurethane coating and wax (to protect the metal square) into a 10% NaOH or HCl solution at room temperature for one week. Any change of the surface (such as transparency, color and gloss, etc.) was recorded.

The effect of different NCO indexes on the adhesive strength are summarized in Table 1, which shows improved strength with increasing NCO index. In all cases the prepolymer was of the MDI-polypropylene glycol type with an NCO index of 9.16% (E-516, from Mobay Chemical Co.) mixed with the aforementioned secondary diamine at ambient temperature, cured at ambient temperature for 100 hours, and molded for 45 minutes at 140° C. That the thickness of the hot melt adhesive influences the lap shear strength, is seen in Table 2. Combining the results of these tables raises the inference that the optimum NCO index is about 107 for the particular prepolymer used.

TABLE 1

| Effect of Different NCO Indexes on the Adhesive Strength | | | | |
|---|---|---|---|---|
| Formulation | 1 | 2 | 3 | 4 |
| NCO Index | 99 | 105 | 107 | 111 |
| Adhesive Strength | | | | |
| Lap shear, psi (Al/Al) | 430 | 287 | 856 | 562 |
| (Thickness), in. | 0.004 | 0.008 | 0.005 | 0.002 |
| Peel strength, lb. in. (180°) | 2.4 | 2.7 | 9.0 | 2.0 |

TABLE 2

| Effect of Different Thickness on the Adhesive Strength | | | |
|---|---|---|---|
| Formulation | 1 | 2 | 3 |
| NCO Index | 99 | 99 | 99 |
| Adhesive Strength | | | |
| Lap shear, psi (Al/Al) | 382 | 430 | 816 |
| (Thickness), in. | 0.007 | 0.004 | 0.002 |

Table 3 summarizes some properties of coatings prepared as previously described. The adduct (190 parts by weight) was mixed with different amounts (in parts by weight) of the secondary diamine to afford coatings of varying NCO/NH ratio. As shown there, the coating from N,N'-di(2-butyl)-4,4'-methylenedianiline with different NCO indexes exhibits better Gardner impact resistance and hardness than the control. The chemical resistance and the solvent resistance are the same as the control, except for the MEK solvent resistance properties.

What is claimed is:

1. A method of bonding two surfaces each of which is selected from the group consisting of rubber, plastics, wood, metal, fabrics, paper, and leather comprising placing between said surfaces of film of a polyurethane resulting from the reaction of an isocyanate terminated urethane prepolymer, said prepolymer being the adduct of from about 1.5 to about 4.0 equivalents of a polyisocyanate with 1 equivalent of a polyol, with from about 0.80 to about 1.2 equivalents of a secondary aromatic diamine as the sole curing agent of the structure,

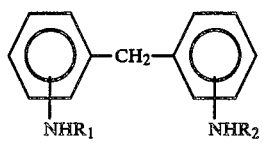

where each alkyl group, $R_1$ and $R_2$, contains from 4 to about 20 carbon atoms, pressing together said surfaces so that each surface is in contact with the film under pressure, heating the film to a temperature between 75° and 150° C. for a time sufficient to melt the film, and cooling the film while maintaining the surfaces under pressure for a time sufficient to achieve adhesion.

2. The method of claim 1 where the prepolymer is an adduct of a diisocyanate and a dihydric alcohol.

3. The method of claim 2 where the diisocyanate is toluene diisocyanate or methylenediphenyl diisocyanate.

4. The method of claim 1 where the alkyl group contains from 4 to about 10 carbon atoms.

5. The method of claim 4 where the alkyl group contains from 4 to 8 carbon atoms.

6. The method of claim 1 where the alkyl is a secondary alkyl moiety.

7. The method of claim 1 where the alkyl group is the 2-butyl group.

8. The method of claim 1 where the diamine is a N,N'-dialkyl-4,4'-methylenedianiline.

9. The method of claim 8 where the diamine is N,N'-di(2-butyl)-4,4'-methylenedianiline.

10. A method of bonding two surfaces each of which is selected from the group consisting of rubber, plastics, wood, metal, fabrics, paper, and leather comprising applying to at least one surface;
(1) an isocyanate terminated urethane prepolymer, said prepolymer being the adduct of from about 1.5 to about 4.0 equivalents of a polyisocyanate with 1 equivalent of a polyol, and;
(2) from about 0.80 to about 1.2 equivalents of a secondary aromatic diamine of the structure,

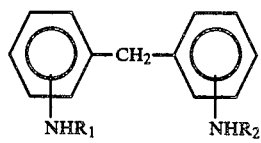

where each alkyl group, $R_1$ and $R_2$, contains from 4 to about 20 carbon atoms;
then pressing together said surfaces, and heating the mass at a temperature between about 75° and about 150° C. to react the prepolymer with the diamine as the sole curing agent so as to form a polyurethane adhesively bonded to each of said surfaces.

11. The method of claim 10 where the prepolymer is an adduct of a diisocyanate and a dihydric alcohol.

12. The method of claim 11 where the diisocyanate is toluene diisocyanate or methylenediphenyl diisocyanate.

13. The method of claim 10 where the alkyl group contains from 4 to about 10 carbon atoms.

14. The method of claim 13 where the alkyl group contains from 4 to 8 carbon atoms.

15. The method of claim 10 where the alkyl is a secondary alkyl moiety.

16. The method of claim 10 where the alkyl group is the 2-butyl group.

17. The method of claim 10 where the diamine is a N,N'-dialkyl-4,4'-methylenedianiline.

18. The method of claim 17 where the diamine is N,N'-di(2-butyl)-4,4'-methylenedianiline.

19. The method of claim 10 where the temperature is from about 75° to about 120° C.

20. A method of coating an object of metal, glass, wood, or plastic comprising applying to a surface of the object a solution or dispersion of a polyurethane resulting from the reaction of an isocyanate terminated urethane prepolymer, said prepolymer being the adduct of from about 1.5 to about 4.0 equivalents of a polyisocyanate with 1 equivalent of a polyol, with from about 0.80 to about 1.2 equivalents of a secondary aromatic diamine as the sole curing agent of the structure,

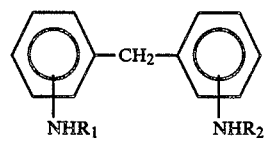

where each alkyl group, $R_1$ and $R_2$, contains from 4 to about 20 carbon atoms and evaporating the solvent or dispersing medium.

21. The method of claim 20 where the prepolymer is an adduct of a diisocyanate and a dihydric alcohol.

22. The method of claim 21 where the diisocyanate is toluene diisocyanate or methylenediphenyldiisocyanate.

23. The method of claim 20 where the alkyl group contains from 4 to about 10 carbon atoms.

24. The method of claim 23 where the alkyl group contains from 4 to 8 carbon atoms.

25. The method of claim 20 where the alkyl is a secondary alkyl moiety.

26. The method of claim 20 where the alkyl group is the 2-butyl group.

27. The method of claim 20 where the diamine is a N,N'-dialkyl-4,4'-methylenedianiline.

28. The method of claim 27 the diamine is N,N'-di(2-butyl)-4,4'-methylenedianiline.

29. A method of coating an object of metal, glass, wood, or plastic comprising applying to a surface of the object;
(1) an isocyanate terminated urethane prepolymer, said prepolymer being the adduct of from about 1.5 to about 4.0 equivalents of a polyisocyanate with 1 equivalent of a polyol, and;
(2) from about 0.80 to about 1.2 equivalents of a secondary aromatic diamine of the structure,

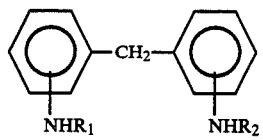

where each alkyl group, $R_1$ and $R_2$, contains from 4 to about 20 carbon atoms;

and then reacting the prepolymer with the diamine as the sole curing agent at a temperature from about 75° to about 150° C. so as to form a polyurethane on said surface.

30. The method of claim 29 where the prepolymer is an adduct of a diisocyanate and a dihydric alcohol.

31. The method of claim 30 where the diisocyanate is toluene diisocyanate or methylenediphenyl diisocyanate.

32. The method of claim 29 where the alkyl group contains from 4 to about 10 carbon atoms.

33. The method of claim 32 where the alkyl group contains from 4 to 8 carbon atoms.

34. The method of claim 29 where the alkyl is a secondary alkyl moiety.

35. The method of claim 29 where the alkyl group is the 2-butyl group.

36. The method of claim 29 where the diamine is a N,N'-dialkyl-4,4'-methylenedianiline.

37. The method of claim 36 where the diamine is N,N'-di(2-butyl)-4,4'-methylenedianiline.

38. The method of claim 29 where the temperature is from about 75° to about 120° C.

* * * * *

UNITED STATES PATENT AND TRADEMARK OFFICE
CERTIFICATE OF CORRECTION

PATENT NO. : 4,714,512

DATED : December 22, 1987

INVENTOR(S) : David W. House et al.

It is certified that error appears in the above-identified patent and that said Letters Patent is hereby corrected as shown below:

In Column 7, line 7: Change "of" (first occurrence; preceding "film") to --a--.

Signed and Sealed this

Third Day of May, 1988

*Attest:*

*Attesting Officer*

DONALD J. QUIGG

*Commissioner of Patents and Trademarks*